United States Patent [19]
Hietkamp

[11] Patent Number: 5,735,503
[45] Date of Patent: Apr. 7, 1998

[54] SERVO PRESSURE REGULATOR FOR A GAS VALVE

[75] Inventor: Albert Hietkamp, Emmen, Netherlands

[73] Assignee: Honeywell Inc., Minneapolis, Minn.

[21] Appl. No.: 738,128

[22] Filed: Oct. 25, 1996

[51] Int. Cl.[6] .................................................. F16K 31/12
[52] U.S. Cl. ................ 251/30.01; 137/65; 137/625.65; 137/625.27
[58] Field of Search ...................... 137/488, 489, 137/489.3, 495, 65, 625.65, 625.27, 116.3; 251/30.01

[56] References Cited

U.S. PATENT DOCUMENTS

| | | | |
|---|---|---|---|
| 1,309,203 | 7/1919 | Hopkins | 137/489.3 |
| 1,540,017 | 6/1925 | Kandall | 251/30.01 |
| 1,798,973 | 3/1931 | Cordier | 251/30.01 |
| 2,155,170 | 4/1939 | Odend'hal | 137/489.3 |
| 2,277,162 | 3/1942 | Soderberg | 137/489.3 |
| 2,473,038 | 6/1949 | Rockwell | 251/30.01 |
| 3,090,592 | 5/1963 | Fleer | 251/30.01 |
| 3,975,135 | 8/1976 | Kinsella | 137/65 |
| 4,250,922 | 2/1981 | Will | 137/116.3 |
| 4,406,400 | 9/1983 | Berkhof | 137/489 |
| 4,785,846 | 11/1988 | Kragten | 137/489 |
| 5,345,963 | 9/1994 | Dietiker | 137/489 |
| 5,348,036 | 9/1994 | Oksanen | 137/489 |
| 5,497,806 | 3/1996 | Swank | 137/625.65 |

FOREIGN PATENT DOCUMENTS

| | | | |
|---|---|---|---|
| 520334 | 3/1955 | Italy | 137/489.3 |

*Primary Examiner*—Denise L. Ferensic
*Assistant Examiner*—Ramyar Farid
*Attorney, Agent, or Firm*—Charles L. Rubow

[57] ABSTRACT

An electromechanical actuator-operated pressure regulator for supplying control pressure for a diaphragm-operated gas control valve, the actuator also operating an on-off control valve for the gas valve. A passageway including a pressure adjusting device for supplying a minimum gas valve output pressure extends from the downstream side of the on-off valve to the gas valve outlet.

5 Claims, 4 Drawing Sheets

SERVO PRESSURE REGULATOR FOR A GAS VALVE

BACKGROUND OF THE INVENTION

The invention generally relates to modulating fuel gas valves, and more specifically to safe, step-opening gas valves which, after opening, supply a regulated output pressure controlled by an electromagnetic actuator which operates a control pressure regulator.

European patent 0 508 357 discloses a step-opening gas valve in which a minimum valve outlet pressure is provided by a pressure limiting valve which, for minimum gas valve output pressure, alters the control pressure supplied by a servo pressure regulator. The pressure limiting valve is in a passageway leading to the gas valve outlet.

In a further pressure regulator of this type known from U.S. Pat. No. 4,785,846, a single electromagnetic operator acts by means of two separate operating levers upon the valve stem of an on-off valve and upon the diaphragm of the pressure regulator respectively. In operation, the on-off valve is opened at the same time a bleed-off passageway between the main valve outlet and the on-off valve is closed. The passageway has an effect only when switching the main valve off. The minimum gas rate required for igniting a burner flame is provided by the minimum open position of the pressure regulator control valve. The minimum open position can be adjusted by means of an adjustable abutment which cooperates with a stop ring or shoulder on an operating rod of the regulator.

Yet further, German patent application 40 01 329 shows a gas valve assembly having a diaphragm-operated gas pressure regulator, a first safety valve upstream of the regulator and a second safety valve downstream thereof. The diaphragm of the pressure regulator is influenced by a control spring whose bias is mechanically adjustable. In addition, a control pressure, such as the pressure in a combustion chamber, may act upon the diaphragm. The pressure regulator generates a control pressure which is supplied to the operating chamber for a pressure-balanced piston valve which is movable within the bores of two walls of the housing. The valve serve pressure regulator piston and walls are sized to avoid contact, thereby leaving clearance therebetween. A direct connection is provided between the inlet chamber of the pressure regulator and the outlet chamber of the main gas valve. This connection is affected by an adjustable valve to provide gas flow at an unregulated minimum starting rate immediately after opening safety valves of the gas valve assembly. Supply of gas at a full regulated pressure begins when said control diaphragm has moved the piston valve from a resting position into an operating position.

In the past a minimum fuel gas valve outlet pressure of about 2 mBar was satisfactory. However, in order to save energy, it has become desirable to work with smaller minimum pressures in the order of 0.5 mBar. Conventionally generated minimum control pressures are not sufficiently accurate for such applications. The Applicant has overcome this problem by providing a gas valve design in which the minimum control pressure for the main gas valve is taken immediately downstream of an on-off valve. Furthermore, improvement of the pressure regulator is realized in that the required throttle between the inlet pressure and the servo-pressure chamber of the pressure regulator is provided by the valve rod of the on-off valve in cooperation with the valve rod bore. Thus, a separate channel with a throttling member is not required, which facilitates a simplified structural design.

DESCRIPTION OF THE PREFERRED EMBODIMENT

Figure 1B:
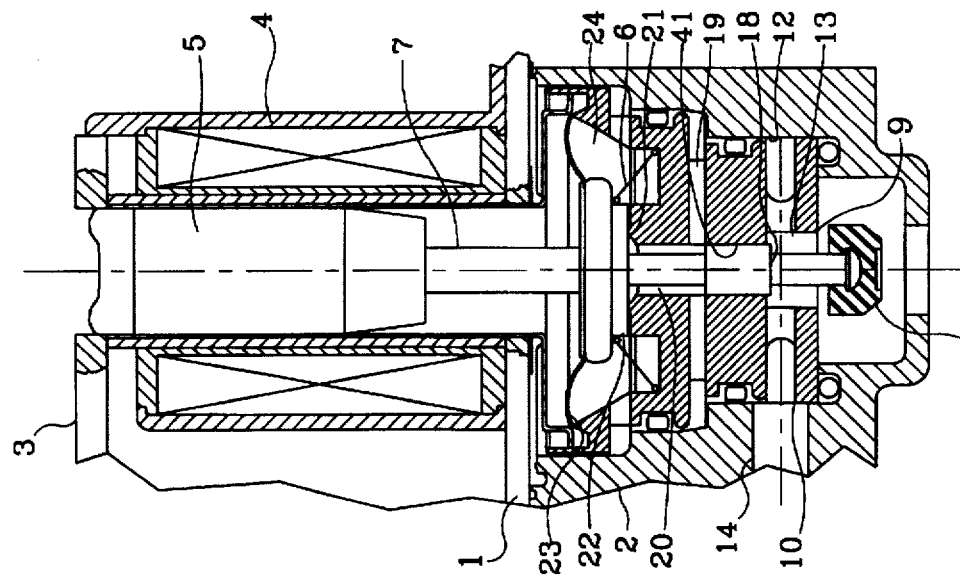
FIG. 1B is a view corresponding to that of FIG. 1B with the on-off valve in its open position.
Figure 1A:
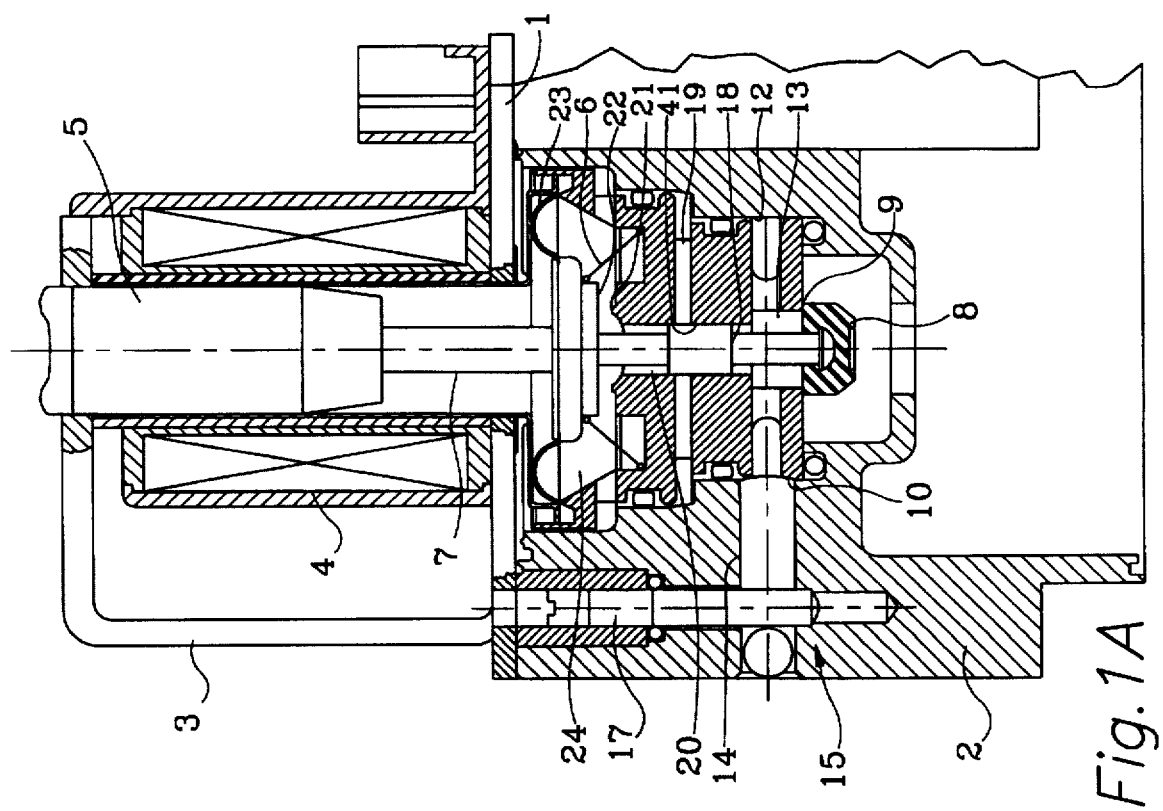
FIG. 1A is a partial cross-sectional view of a gas valve in accordance with the Applicant's invention, shown with an on-off valve in its closed position.
Figure 2:
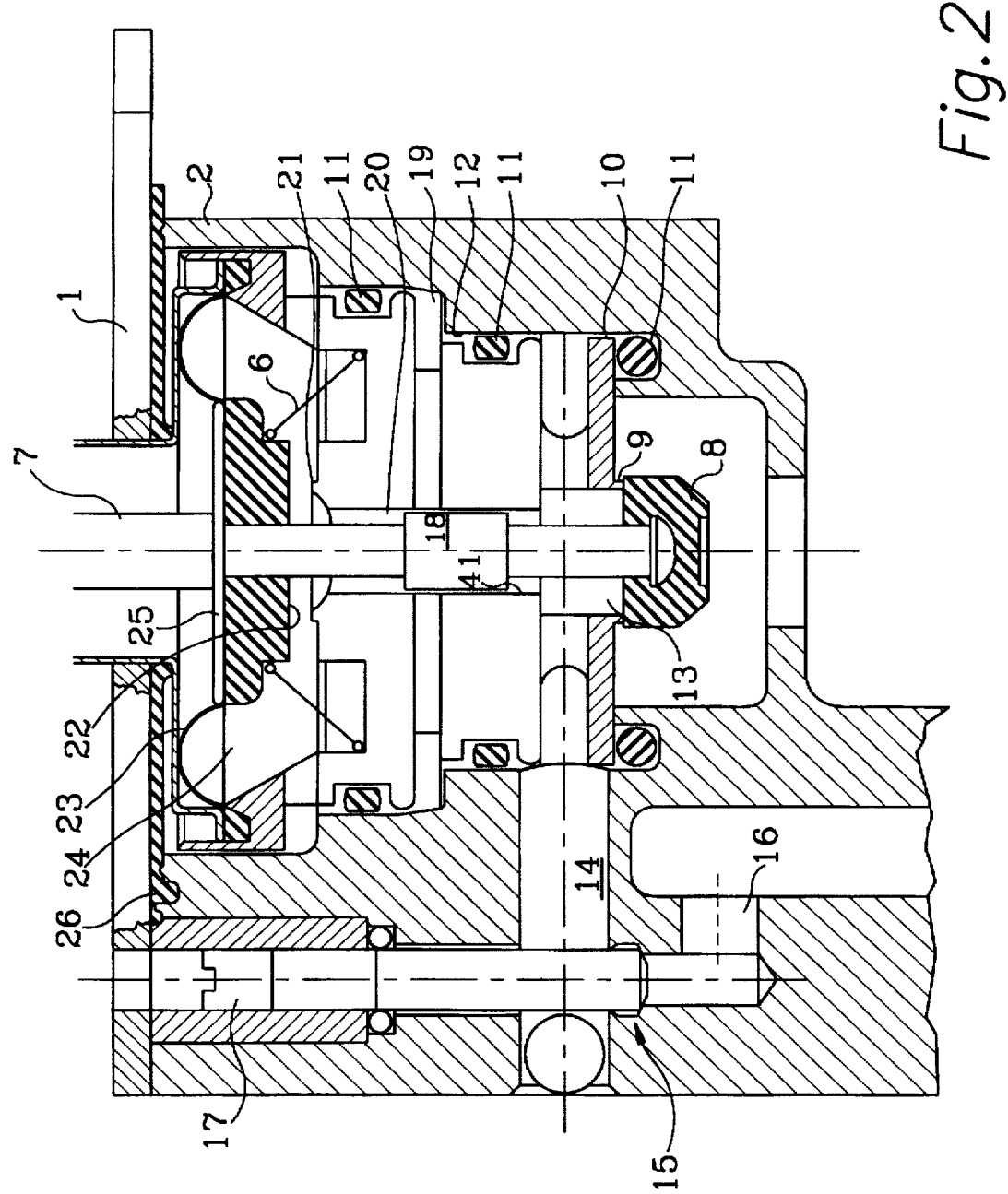
FIG. 2 is an enlarged view of a portion of FIG. 1A.

With reference to the servo pressure regulator of FIGS. 1A, 1B and the enlargement of FIG. 2, an electromagnetic linear operator is mounted on a cover plate 1 of a valve housing. The electromagnetic actuator includes a magnetic yoke 3, a coil 4 and an armature 5 which is axially movable inside the coil. Armature 5 is maintained in the resting position shown in FIGS. 1A and 2 without current flowing through coil 4 by means of a spring 6, of which one end abuts the housing. Although a conical coil spring is illustrated, a spring of helical or other configuration may be equally suitable. The actuator may comprise a stationary coil 4, and a movable armature 5 as shown, or a moving coil actuator comprising a stationary magnetic circuit and a moving coil may be employed.

As shown, a valve stem 7 extends downwardly from the opening through coil 4, and at its lower end carries a closure member 8 of an on-off valve. An associated valve seat 9 is formed by the lower edge of an insert 10 mounted in a stepped through-hole 12 in the valve housing. O-rings 11 provide a seal between insert 10 and the housing. A first chamber 13 immediately downstream from the on-off valve is connected to a channel 16 via a channel 14 and an adjustable orifice or throttle valve 15. Channel 16 is connected to the main valve outlet passageway. A minimum outlet pressure of the gas valve can be adjusted by means of an orifice adjusting or throttling screw 17.

Valve stem 7, downstream from chamber 13, carries an enlarged cylindrical portion or piston 18, which, in cooperation with the surrounding bore or wall 41, constitutes a throttling passageway of predetermined cross-section and variable length. The servopressure for the operating chamber of the main valve is taken from a chamber 19. Chamber 19 is connected through the throttling passageway to channel 20 surrounding valve stem 7. Channel 20 terminates at a valve seat 21. Valve seat 21 cooperates with the central portion 22 of a diaphragm 23 which constitutes a closure member. Valve stem 7 is held and sealed in the central portion 22 of diaphragm 23, e.g. is buttoned into this central portion (see FIG. 2). Spring 6 is pressed at its upper end into a surrounding groove of central portion 22 of diaphragm 23. A chamber 24 between diaphragm 23 and valve seat 21 is connected to a channel 44 as shown schematically in FIG. 3. This channel is in fluid communication with the outlet port 34 of the main gas valve. A diaphragm disk 25 provided on valve stem 7 constitutes an abutment for the central portion 22 of diaphragm 23. A diaphragm-like seal 26 provides a sealing between the stepped opening of the housing 2 and cover plate 1.

Figure 3:
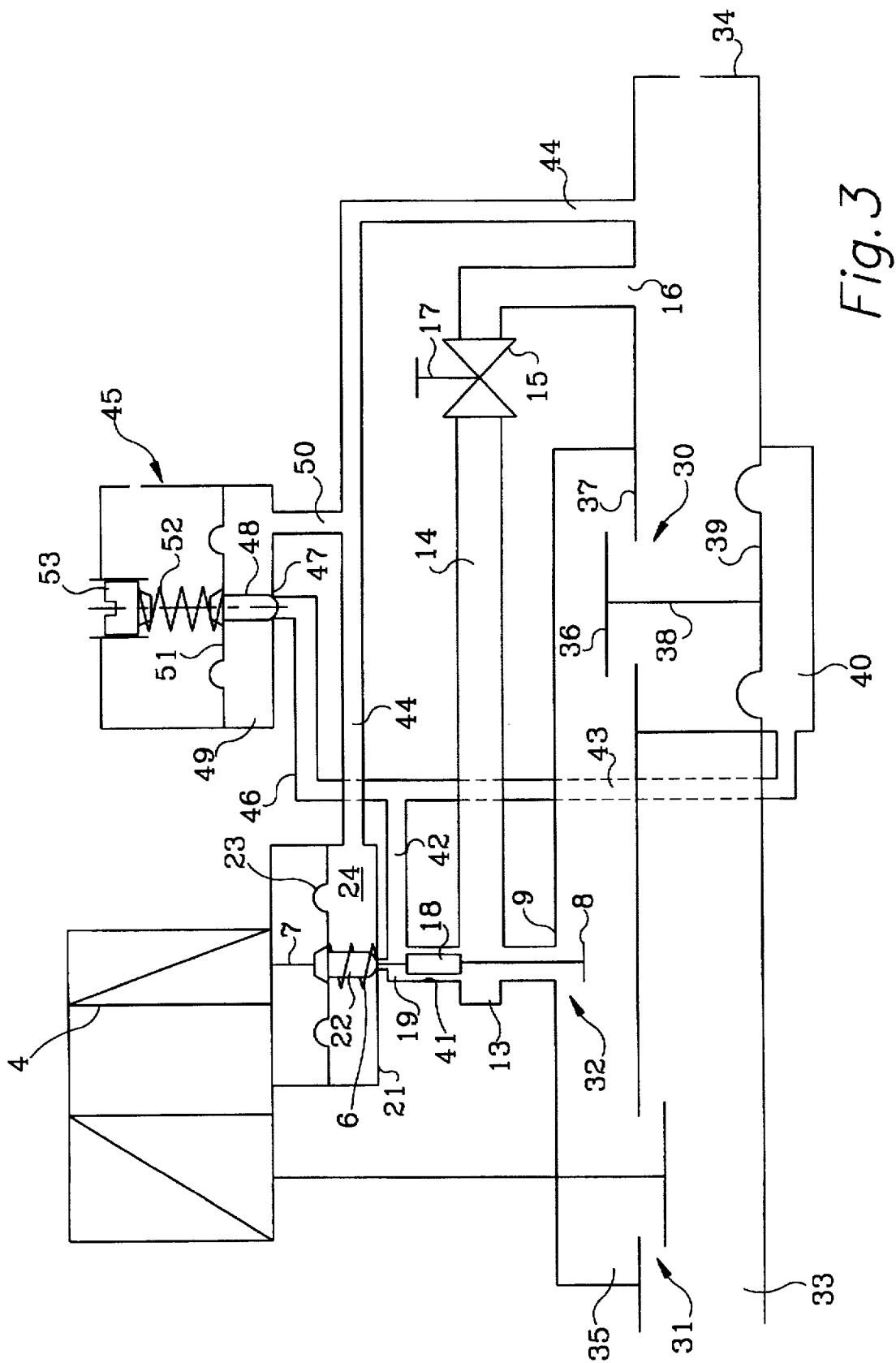
FIG. 3 is a schematic representation of a gas valve in accordance with the Applicant's invention, including a servo pressure regulator and a diaphragm-operated main gas valve.
Figure 4:
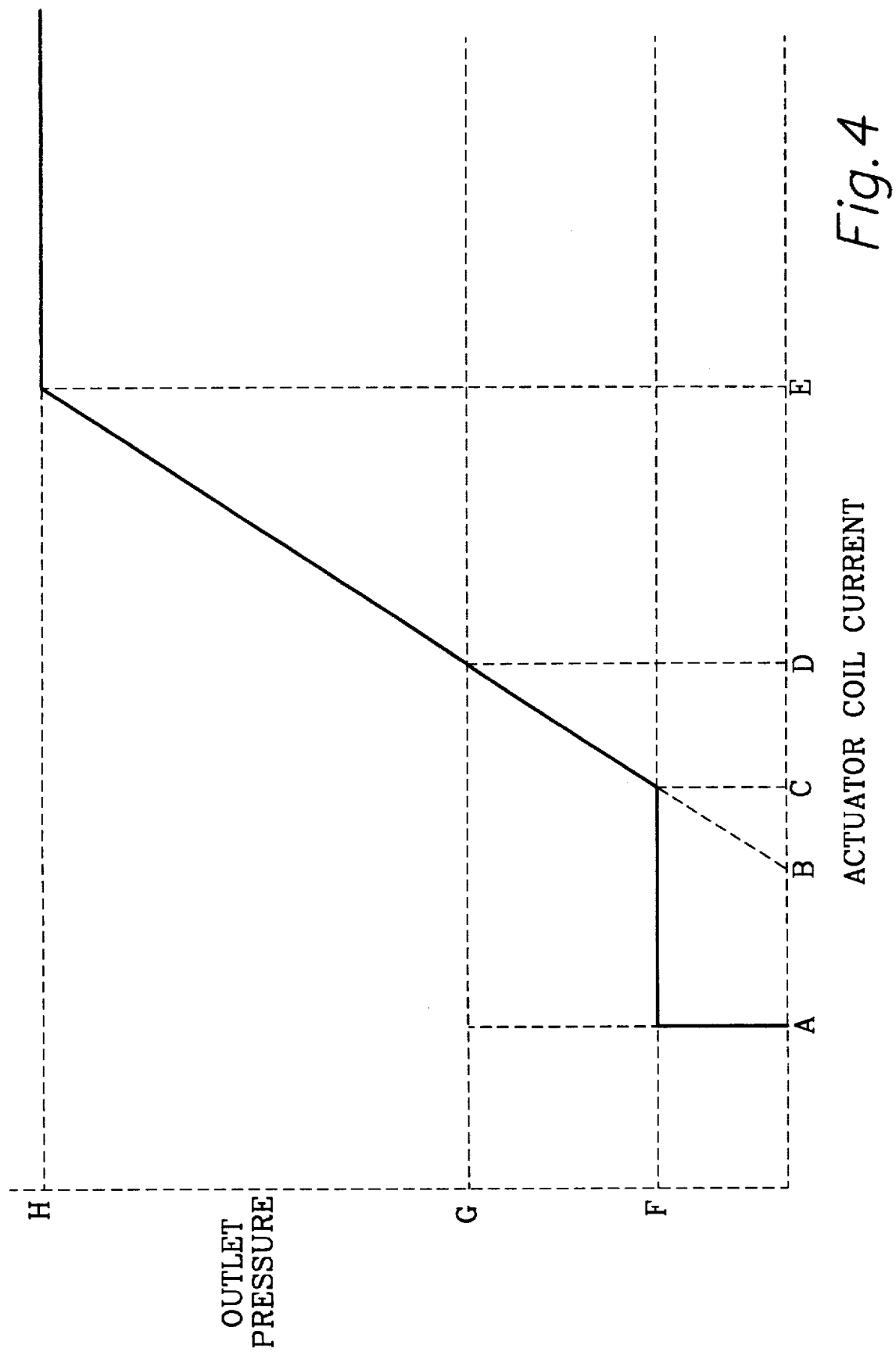
FIG. 4 is a graphic representation of the main valve outlet pressure as a function of current supplied to the coil of an electromagnetic actuator which controls the servo pressure regulator.

The operation of the pressure regulator now will be described in connection with the gas control apparatus schematically shown in FIG. 3 which consists of a main gas valve 30, a safety valve 31 mad a servo pressure regulator 32. Gas flows from a supply pipe via inlet 33 into the gas control apparatus and leaves this apparatus through outlet port 34 to which a burner may be connected. The servo pressure regulator is supplied with gas when safety valve 31 is open. The structure and operation of such safety valves are known. In FIG. 3 all valves are shown in the open positions although when in resting position they are actually closed by return springs (not shown). In FIG. 4 the pressure at outlet port 34 of the gas control apparatus is shown as a function of the current supplied to actuator coil 4.

As soon as gas enters space 35 below on-off valve 8, 9 via safety valve 31, the burner cycle may be initiated. For this purpose a current is fed to coil 4 of the actuator and produces a magnetic field which exerts a force on armature 5. This force is transmitted to closure member 8 to move it downward. As soon as this current exceeds a minimum value A (see FIG. 4), closure member 8 is lifted from valve seat 9 and moves into the open position as shown in FIG. 1B. With on-off valve 8, 9 opened, gas flows into chamber 13. From there a minimum gas pressure F reaches outlet 34 of the gas control apparatus via channel 14, throttle valve 15 which provides an adjustable minimum outlet pressure, and channel 16. From there this pressure is applied to the burner.

The main gas valve consisting of closure member 36, valve seat 37, valve stem 38, diaphragm 39 and operating chamber 40 remains closed under the influence of a return spring (not shown). The piston-like enlargement 18 of valve stem 7 in connection with wall 41 surrounding said piston constitutes a throttling member which pneumatically separates chamber 19, exposed to the servo pressure, from chamber 13, exposed to the inlet pressure. When on-off on valve 8, 9 is opened by actuator 3, 4, 5, the valve stem is moved downward until throttling piston 18 completely dips into bore 41. Via open on off valve 8, 9 and throttling passageway 18, 41, gas is supplied to chamber 19 where a control pressure is slowly built up as a result of closure of bleed valve 21, 22. This control pressure is fed to operating chamber 40 of main valve 30 via channels 42 and 43.

As soon as the force generated by the control pressure within operating chamber 40 and acting upwardly on diaphragm 39 exceeds the force of the return spring (not shown) acting downwardly on diaphragm 39 together with the force generated by the inlet pressure on top of closure member 36, diaphragm 39 moves valve stem 38 upwardly and lifts closure member 36 from valve seat 37. Then gas flows from inlet 33 via chamber 35 and through main valve 30 to outlet port 34 with a flow rate which is determined by modulating pressure regulator 32 shown in detail in FIGS. 1 and 2. Depending on the minimum gas pressure, e.g. F or G in FIG. 4, as adjusted by means of throttle valve 15, this modulating pressure starts at actuator current value C or D in FIG. 4. The higher the adjusted minimum pressure is, the stronger the energizing current must be in order to provide a linear increase in outlet pressure. Current valve B corresponds to the starting point of the linear pressure increase resulting from the force acting through valve stem 7. In addition, the above-discussed minimum gas rate flows via channels 14 and 16 to outlet port 34. Opening of on-off valve 8, 9 at a predetermined current value A is independent from the curve of the modulating characteristic B-E of the servo pressure regulator.

The control pressure generated in chamber 19 is also applied to the bottom side of diaphragm 23 and there balances the force provided by armature 5. When the pressure in chamber 19 increases, closure member 22 is lifted further from seat 21 so that a portion of this control pressure in chamber 19 is bled-off to outlet port 34 via channel 44. This situation continues until valve 21, 22 closes again when the pneumatic force of the pressure generated in chamber 24 acting on diaphragm 23 equals the force which armature 5 transmits to valve stem 7. Since the minimum gas rate is solely determined by the position of throttle valve 15, and does not depend on the state of the servo controller, a very small minimum pressure can be achieved at outlet port 34. The accuracy of this minimum pressure is affected by the pressure at inlet 33. However, since pressure changes at the inlet appear reduced by the relation of inlet-to-outlet pressure behind throttle valve 15, these changes are very small.

For limiting the maximum pressure H at outlet 34 a pressure limiter 45 is provided which is connected to control pressure chamber 19 of the regulator via channels 46 and 42 which are also connected to operating chamber 40 of main valve 30. If the pressure in channel 46 increases too much, this pressure is bled-off via the valve of the pressure limiter 45 consisting of valve seat 47 and closure member 48. For this purpose pressure chamber 49 of the pressure limiter is connected via a channel 50 to a further channel 44 which leads to the outlet. The maximum pressure level can be adjusted to a desired value by means of a spring 52 and an associated adjustment screw 53. As soon as the energizing current exceeds value E, the outlet pressure is limited to its maximum value H.

If, because of an increasing demand for heat from the load heated by the burner, e.g. a space heating apparatus or a hot water supply apparatus, the gas flow to the burner is to be increased, main valve 30 must be opened further which means that the control pressure within operator chamber 40 must also be increased. For this purpose a higher current is supplied to actuator coil 4 so that valve rod 7 is pressed downwards with an increased force. Bleed valve 21, 22 therefore opens at a higher pressure under diaphragm 23, such pressure being the pressure in chamber 19 which, via bore 20, acts on closure member 22 of the bleed valve. The value of the control pressure, increased in the above-described manner, again is given as mentioned above by the force balance at valve stem 7. If the gas flow to the burner is to be decreased, the energizing current for the solenoid is reduced so that bleed valve 21, 22 opens at a lower control pressure. As this control pressure decreases the position of main valve closure member 36 is moved toward valve seat 37.

For adjusting the minimum gas pressure, e.g. F or G at outlet 34, the force of spring 52 acting on diaphragm 51 is reduced to zero. No control pressure can then build up in chamber 19. Main valve 30 remains closed under the influence of its return spring (not shown). All pressure within chamber 19 is bled off to outlet port 34 via open valve 47, 48. The outlet pressure then is determined by throttle valve 15. Accordingly, it can be adjusted by means of throttling screw 17 to provide the minimum gas pressure.

Although a particular embodiment has been shown and described for illustrative purposes, various modifications and other embodiments within the Applicant's teachings will be apparent to those of ordinary skill in the relevant arts. It is intended that coverage not be limited to the embodiment shown, but only by the scope of the following claims.

The embodiments of the invention in which an exclusive property or right is claimed are defined as follows:

1. In a pressure regulator for generating a control pressure for a diaphragm-operated gas valve which controls gas flow through a first passageway between an inlet and an outlet, the pressure regulator being of the type in which the control pressure is determined by an electromagnetic operator which operates a bleed valve including a first closure member carried on a valve stem and an on-off valve including a second closure member carried on the valve stem, the improvement which comprises:

a second passageway for supplying gas at an unregulated minimum pressure from the inlet to the outlet of the diaphragm-operated gas valve, said second passageway including means for adjusting the unregulated minimum pressure the on-off valve being arranged to control gas flow through said second passageway; and a throttling device located downstream of said second passageway for supplying gas from the downstream side of said on-off valve to the bleed valve, said throttling device being formed by a gap between the valve stem and a surrounding wall of a bore in a housing assembly in which the diaphragm operated gas valve is formed, said valve stem being positioned to extend through the bore, wherein a first pressure chamber is defined in the housing assembly and is fluidly coupled to said second passageway, a second pressure chamber is defined in the housing assembly downstream of the first pressure chamber a control chamber of the diaphragm-operated gas valve being fluidly coupled to the second pressure chamber by a third passageway, and a third pressure chamber is defined in the housing assembly downstream of the second pressure chamber and is fluidly coupled to a fourth passageway that bleeds excess pressure to the outlet of the gas valve, the first closure member being located in the third chamber, the first second and third chambers being separated by partitions of the housing assembly.

2. The pressure regulator of claim 1 wherein said valve stem is formed with an enlarged cylindrical section in the region of the bore, the width and the length of the gap between the cylindrical section and the wall of the bore determining the throttling action.

3. The pressure regulator of claim 2 wherein:

said housing assembly includes an insert having the bore therethrough, the bore being aligned with a central axis and terminating at opposite ends in first and second valve seats which respectively cooperate with said first and second closure member to form the pressure regulator and said on-off valve respectively, the enlarged cylindrical section being located between the first and second closure members, said second passageway intersecting the bore at a location between said first closure member and the enlarged cylindrical section of said valve stem; and the pressure regulator includes a channel opening from the bore between said throttling device and the bleed valve for supplying the control pressure from the pressure regulator to the diaphragm-operated gas valve.

4. The pressure regulator of claim 3 wherein:

said housing assembly includes a valve housing formed with a through hole of stepped diameter aligned with the central axis; and said insert is of circular cross section perpendicular to the central axis, and of generally stepped diameter corresponding to the stepped diameter of the through hole.

5. The pressure regulator of claim 4 wherein said third chamber is defined in part by a flexible diaphragm fixed to said valve stem and forming a fluid tight seal between said valve stem and said housing assembly.

* * * * *

UNITED STATES PATENT AND TRADEMARK OFFICE
CERTIFICATE OF CORRECTION

PATENT NO. : 5,735,503
DATED : April 7, 1998
INVENTOR(S) : Albert Hietkamp

It is certified that error appears in the above-indentified patent and that said Letters Patent is hereby corrected as shown below:

Claim 3, line 6, delete "member" and insert --members--.

Signed and Sealed this

Twelfth Day of January, 1999

Attest:

*Attesting Officer*   *Acting Commissioner of Patents and Trademarks*